Feb. 21, 1928.
R. P. LEOPOLD
1,660,132
CONDENSER
Filed Nov. 20, 1925
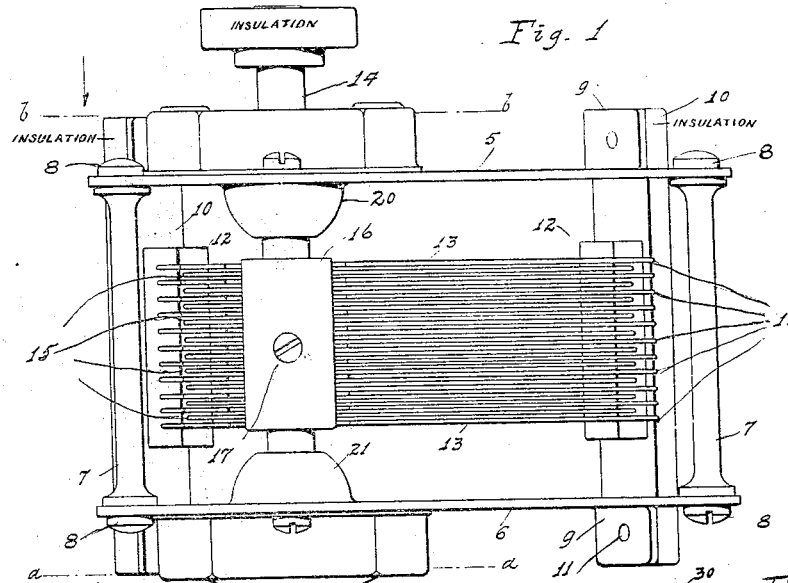
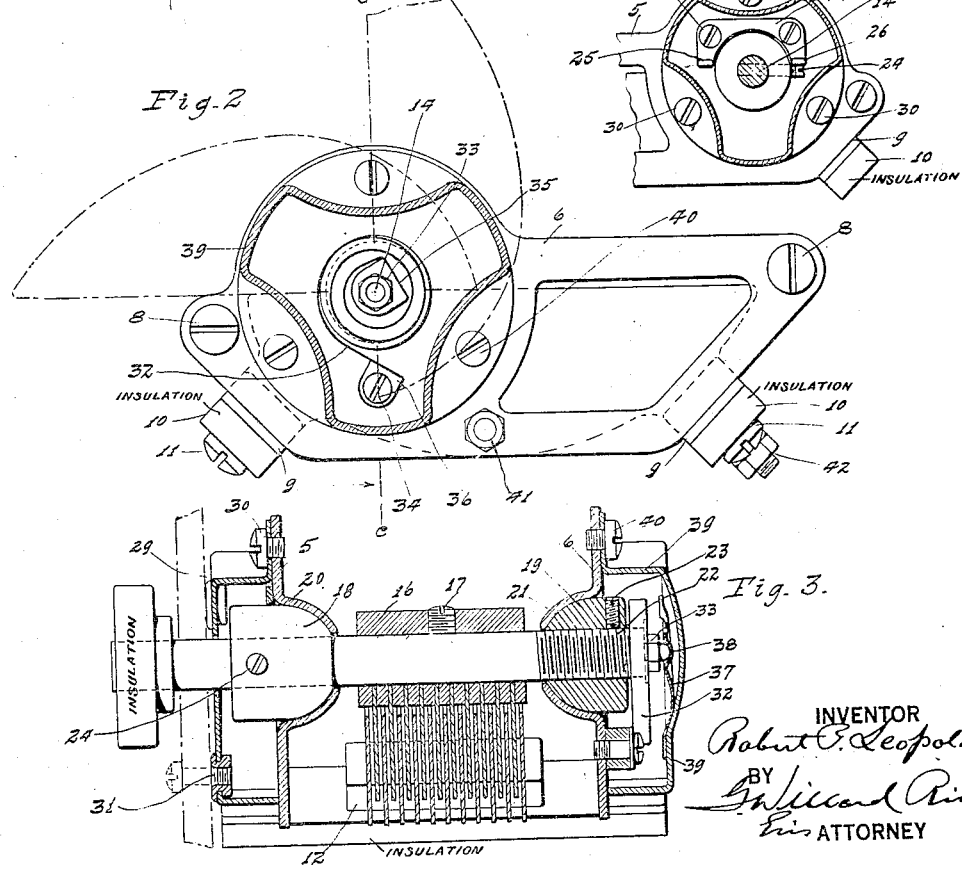
INVENTOR
Robert P. Leopold
BY
G. Willard Rich
ATTORNEY Patented Feb. 21, 1928.

1,660,132

UNITED STATES PATENT OFFICE.

ROBERT P. LEOPOLD, OF PHILADELPHIA, PENNSYLVANIA, ASSIGNOR TO WIRT COMPANY, OF PHILADELPHIA, PENNSYLVANIA, A CORPORATION OF MAINE.

CONDENSER.

Application filed November 20, 1925. Serial No. 70,230.

This invention relates to condensers and has particular application to that type of condenser employing a movable unit such as a variable electrostatic condenser.

It has for an object the provision of a new and improved form of condenser which will be specially adapted for use with currents of high frequency, as for example, radio receiving circuits.

Another object is to provide a condenser which has a high degree of rigidity and whose operating efficiency will not be readily influenced by moderate changes in the relative positions of the frame parts.

Another object is to provide a bearing for the rotor shaft in a variable condenser which will have a high degree of efficiency.

Another object is the provision of a variable condenser whose essential parts may be easily adjusted and maintained in adjustment.

Considerable interest is being shown at the present time in the effects of the condenser characteristics on the reception which may be obtained with a given radio receiving circuit. With condensers in which the rotor plates are semi-circular discs, it has been found that equal movements of the dial produce different capacity changes over the dial range and as a result the logging of stations become somewhat complicated, due to the grouping of a large number of stations in the lower dial range.

With the straight line frequency type condenser this trouble is obviated. With this type of condenser it is possible to bring in various broad-casting stations which are operating at different frequencies at such points on the operating dial of the circuit, that the stations will be fairly evenly distributed over the dial range. Equal graduation of frequency over the dial range is produced in the straight line frequency condensers by giving the plates eccentric shapes of the general form illustrated in the figures of the accompanying drawing.

Regardless of the results obtained by various types of condensers, however, it is essential that the particular condenser employed possess a high degree of rigidity to withstand continual use without permitting any substantial slippage of the rotor shaft or movement of the rotor plates relative to the stator plates. This is an especially important item in the construction of straight line frequency condensers which are customarily manufactured with plates of light material closely spaced to off set the increased number of plates required and to restrict the over-all dimensions. Furthermore with the eccentric form of plate which is being employed in straight line frequency condensers, the rotor shaft is set at one end of the frame and the rotor plates swing considerably outside of the condenser frame. With this design, it is obvious that the weight is concentrated on one side of the shaft and the torque will be considerable as soon as the rotor passes the center of gravity of this member. Therefore, it is essential that the condenser structure possess a high degree of rigidity so as to maintain the rotor and stator plates in alinement.

The present invention overcomes the objections outlined above by providing a condenser construction which affords an economical construction and which combines compactness with a high degree of rigidity.

Briefly this is accomplished by providing bearings for the rotor shaft which possess convex shaped surfaces. In the present construction provision is also made for adjusting the positions of the bearing elements on the rotor shaft and regulating the pressures between the bearing surfaces of the shaft and the bushings of the bearing. Means for regulating the position of the rotor plates on the rotor shaft and thereby adjusting the alinement and position of the rotor plates relative to the stator plates are also included in the structure of the invention.

A more thorough understanding of the invention will be had in connection with the accompanying drawings in which:

Fig. 1 is a top view of a variable electrostatic condenser of the straight line frequency type constructed in accordance with the invention.

Fig. 2 is an end view along the line a—a of Fig. 1.

Fig. 3 is a sectional view along the line c—c of Fig. 2.

Fig. 4 is a sectional view with a portion of the end plate broken off along the line of b—b of Fig. 1.

Referring to the figures of the drawing the end frame plates 5 and 6 which are preferably made of an electrical conducting material such as brass or aluminum are connected to form a condenser frame work by a suitable number of members 7, two being shown in the drawing. The ends of the spacing members 7 are internally threaded and bolts 8 are provided for firmly holding the end plates 5 and 6 to the spacing members 7.

The end plates 5 and 6 are provided with extending tongues 9 and the corresponding pairs of tongues on the two end plates are connected with insulating members 10 which are joined to the tongues 9 by suitable means, such as screws 11.

To the insulating members 10 are secured means 12 for rigidly holding a series of stator plates 13 in spaced relationship between and parallel to the frame plates 5 and 6. The stator plates 13 each have substantially semi-circular edges and end portions which extend into grooves in the spacing blocks 12.

The shaft 14 supporting the rotor member extends through the frame plates 5 and 6 and carries the spaced rotor plates 15 which are mounted on a suitable collar 16 fitted over the shaft 14 and rigidly secured by the set screw 17. The rotor plates 15 are shown as having the long shape narrowing to a point at their free ends. By securing the rotor plates to a collar in turn fitted over the rotor shaft instead of directly to the shaft, means for easily maintaining the rotor and stator in proper spacing at all times are provided.

At the points where the shaft 14 passes through the end plates suitable bearings are employed. In accordance with the invention these bearings comprise members 18 and 19 secured to the shaft 14 and cooperating bushings or bosses 20 and 21 surrounding said members and preferably formed by recessing parts of the frame pieces 5 and 7, respectively. In order to provide a bearing of high efficiency which will not be materially affected by moderate movements of the frame pieces relative to each other the cooperating bearing surfaces are preferably spherically convex on their contiguous faces.

With the use of bearing elements, in accordance with the invention, the convex surfaces provide compartively large areas of bearing surfaces, the shapes of which assure a smooth operating engagement, even for positions of the end plates in which the shaft openings are somewhat out of alinement. If desired a lubricant such as a graphite grease may be placed between the bearing surfaces; this will not only decrease the friction and thereby impart a smooth movement of the parts to afford delicate adjustment of the rotor relative to the stator, but also by reason of the viscosity of the lubricant will cause the rotor when moved only slightly to remain in its adjusted position.

The members 18 and 19 preferably extend slightly beyond the frame pieces 5 and 6, and one or both may be made adjustable to facilitate the correct positioning of the rotor plates laterally between the stator plates. For example, one of the members, as 18, is made in the form of a collar which may be rigidly positioned and locked in place by the set screw 24 entering an aperture in the shaft and the other member 19 screw-threaded on the other end of the shaft as indicated by 22, and adjusted by rotating it thereon to move the shaft lengthwise until the desired position of the latter is produced and the desired amount of friction between the stationary elements of the bearings is obtained, when it may be locked by the set screw 23. The position of the set screw 24 is also preferably made such that it will define the limits of the rotation of the rotor plates by contacting with arms 25 and 26 which are attached to a member 27 secured with screws 28, for example, to the end plate 5.

As a mechanical protection for the bearing member 18 and for keeping dust and foreign matter from said bearing, a suitable cap 29 is attached by means of screws 30 to the end plate 5.

For connecting the condenser to a suitable support such as a radio receiving set panel, the cap 29 is provided with three threaded openings such as 31. These openings are preferably spaced intermediate to the screws 30 holding the cap to the end piece, in order to distribute the stress resulting from supporting the condenser over a larger area and thereby lessen the likelihood of producing changes in the relative positions of the rotor and stator plates.

As stated heretofore, with the design of rotor plates shown in the drawings, the weight is concentrated on one side of the rotor shaft and the torque is therefore considerable when the rotor plates are in certain positions of adjustment. In order to counter-balance the torque produced by the weight of the rotor plates, a pig-tail spring 32, is secured at one end to one end of the rotor shaft by means of the nut 33 and to the frame piece 6 by screw 34. This spring which is a spiral, as shown in Fig. 2, is provided at its ends with the ears 35 and 36 to facilitate its attachment as described, but as the spring has an appreciable width and surrounds the projecting end of the shaft, these ears are arranged to lie in the planes of the edges of the springs as shown in Fig. 3.

In a condenser structure it is desirable that the frame work be made as light as possible and spaced away from the area in which the sets of condenser plates are located, but the reduction of the mass or weight of material in the frame pieces renders them susceptible to being sprung together by the fingers in careless handling. This will be seen to be likely to affect the previously accurately adjusted bearing contacts. In order to obtain the advantages of constructing the frames of light material and yet render any distortion to which the device may be subjected by careless handling immaterial, means are provided which permit the side pieces of the frame to be distorted by a relative movement toward each other and which will at the same time insure the frame pieces and the shaft to always assume their normal positions and adjustments. Broadly stated this object is accomplished by the provision of a yielding member pressing against the shaft and tending to impart a relative longitudinal movement to the shaft and lateral movement to one of the frame pieces.

A suitable device for accomplishing this latter object is a three-legged spider spring 37 held in contact with the end 38 of the shaft 14 by means of a cap 39 secured to the end piece 6 by screws 40. In addition to permitting movements of the end pieces relative to each other without substantially altering the lateral positions of the rotor plates relative to the stator plates, the spring 37 also serves to insure the maintenance of a desirable pressure between the bearing elements 18 and 19 and the corresponding bushings 20 and 21. The cap 39 also protects the bearing 19 and the spring 32.

As a means for connecting the condenser in a given circuit suitable binding posts 41 and 42 comprising for example threaded members and inner and outer lock nuts, are provided. The post 38 may be made to serve the additional purpose of holding one of the spacing elements 12 to the insulating member 10.

In accordance with the provisions of the patent statutes the principle of the invention has been described, and illustrated by the portrayal of a structure which in practice has proved to be a satisfactory embodiment thereof, but is desired to have it understood that the structure shown is merely illustrative, and that the invention may be carried out in other ways.

The invention having been described, what is claimed as new and desired to be secured by Letters Patent is as follows:—

1. In an electric current controlling device, the combination with spaced supporting frame pieces each provided with an inwardly struck boss having an inner concave surface, of a shaft, collars on said shaft having convex surfaces bearing within said bosses, and means for adjusting said collars on the shaft to longitudinally position the shaft and to produce the desired frictional engagement between the collars and the bosses.

2. In a bearing, the combination with spaced frame pieces having opposed off-set recessed portions provided with apertures and interior spherical surfaces surrounding the latter, of a shaft extending through the apertures, collars on the shaft each having a spherical surface engaging the corresponding surface in the frame pieces and having hub portions projecting outside of the recesses, devices in said hub portions for locking the collars in adjusted position on the shaft, and caps on the frame pieces enclosing said collars.

3. In an electric current regulator, the combination with a frame composed of front and rear members spaced apart, each having an embossed spherical portion extending inwardly and provided with a central aperture, of a shaft extending through the latter, bearing collars adjustably mounted on said shaft having spherical portions seated within said embossed portions, and a housing member secured to one of said frame pieces and enclosing the bearing parts thereon and having means for attachment to a support.

4. In a bearing, the combination with front and rear frame pieces spaced apart and having inwardly extending spherical bosses of a shaft extending therethrough and provided with similarly shaped collars adjustable relative to each other, a spring acting on one of the frame pieces and on said shaft tending to maintain pressure between one of said collars and the corresponding boss on said frame piece.

This specification signed this seventeenth day of November, 1925.

ROBERT P. LEOPOLD.